(12) United States Patent  
Kato

(10) Patent No.: US 7,113,480 B2
(45) Date of Patent: Sep. 26, 2006

(54) MOBILE COMMUNICATION SYSTEM AND OPERATION CONTROL METHOD THEREOF

(75) Inventor: Hidenori Kato, Tokyo (JP)

(73) Assignee: NEC Corporation, Tokyo (JP)

( * ) Notice: Subject to any disclaimer, the term of this patent is extended or adjusted under 35 U.S.C. 154(b) by 267 days.

(21) Appl. No.: 10/612,949

(22) Filed: Jul. 7, 2003

(65) Prior Publication Data

US 2004/0009773 A1   Jan. 15, 2004

(30) Foreign Application Priority Data

Jul. 10, 2002   (JP)   ............................. 2002-200705

(51) Int. Cl.
*G01R 31/08* (2006.01)
(52) U.S. Cl. .................. 370/235; 370/338; 370/310.1; 370/395.52
(58) Field of Classification Search ................ 455/428, 455/445, 424, 453, 452.1, 434, 426.2, 425, 455/455; 370/352, 353, 535, 338, 351, 354, 370/356, 395.31, 395.32, 395.51, 310.1, 370/235, 395.52
See application file for complete search history.

(56) References Cited

U.S. PATENT DOCUMENTS

| | | | | |
|---|---|---|---|---|
| 5,228,076 A | * | 7/1993 | Hopner et al. ............ | 379/93.17 |
| 5,933,777 A | * | 8/1999 | Rahman .................... | 455/450 |
| 6,119,015 A | * | 9/2000 | Eun .......................... | 455/502 |
| 6,914,878 B1 | * | 7/2005 | Lindblom et al. .......... | 370/219 |
| 2002/0085512 A1 | * | 7/2002 | Lehtimaki et al. ......... | 370/328 |
| 2003/0099195 A1 | | 5/2003 | Lee | |
| 2003/0104816 A1 | * | 6/2003 | Duplessis et al. .......... | 455/448 |
| 2003/0117983 A1 | * | 6/2003 | Ton et al. ................... | 370/338 |
| 2003/0179720 A1 | | 9/2003 | Cuny | |
| 2003/0185190 A1 | * | 10/2003 | Chitrapu et al. ........... | 370/338 |
| 2003/0190915 A1 | * | 10/2003 | Rinne et al. ............... | 455/436 |
| 2004/0043771 A1 | * | 3/2004 | Shin ......................... | 455/453 |
| 2004/0062251 A1 | * | 4/2004 | Johansson et al. ..... | 370/395.52 |
| 2005/0083876 A1 | * | 4/2005 | Vialen et al. .............. | 370/328 |

FOREIGN PATENT DOCUMENTS

EP   1 283 617 A   2/2003

* cited by examiner

*Primary Examiner*—Eliseo Ramos-Feliciano
*Assistant Examiner*—Dai Phuong
(74) *Attorney, Agent, or Firm*—Foley & Lardner LLP

(57) ABSTRACT

In a W-CDMA communication system, even the RNC goes into the congestion state due to increasing user data, the RNC may distribute loads while continuously performing its processing without causing system down. An ATM network used in a RAN is IP-networked, where a C plane processing device for signaling processing and a U plane processing device for user data processing are provided in a physically separated manner. With the U plane processing device, a backup system is prepared independently from an active system. When congestion occurs in the active system, part of processing is switched to and inherited by the backup system.

16 Claims, 18 Drawing Sheets

APL PART 73 OF U PLANE PROCESSING DEVICE (ACTIVE)

APL PART 83 OF U PLANE PROCESSING DEVICE (BACKUP)

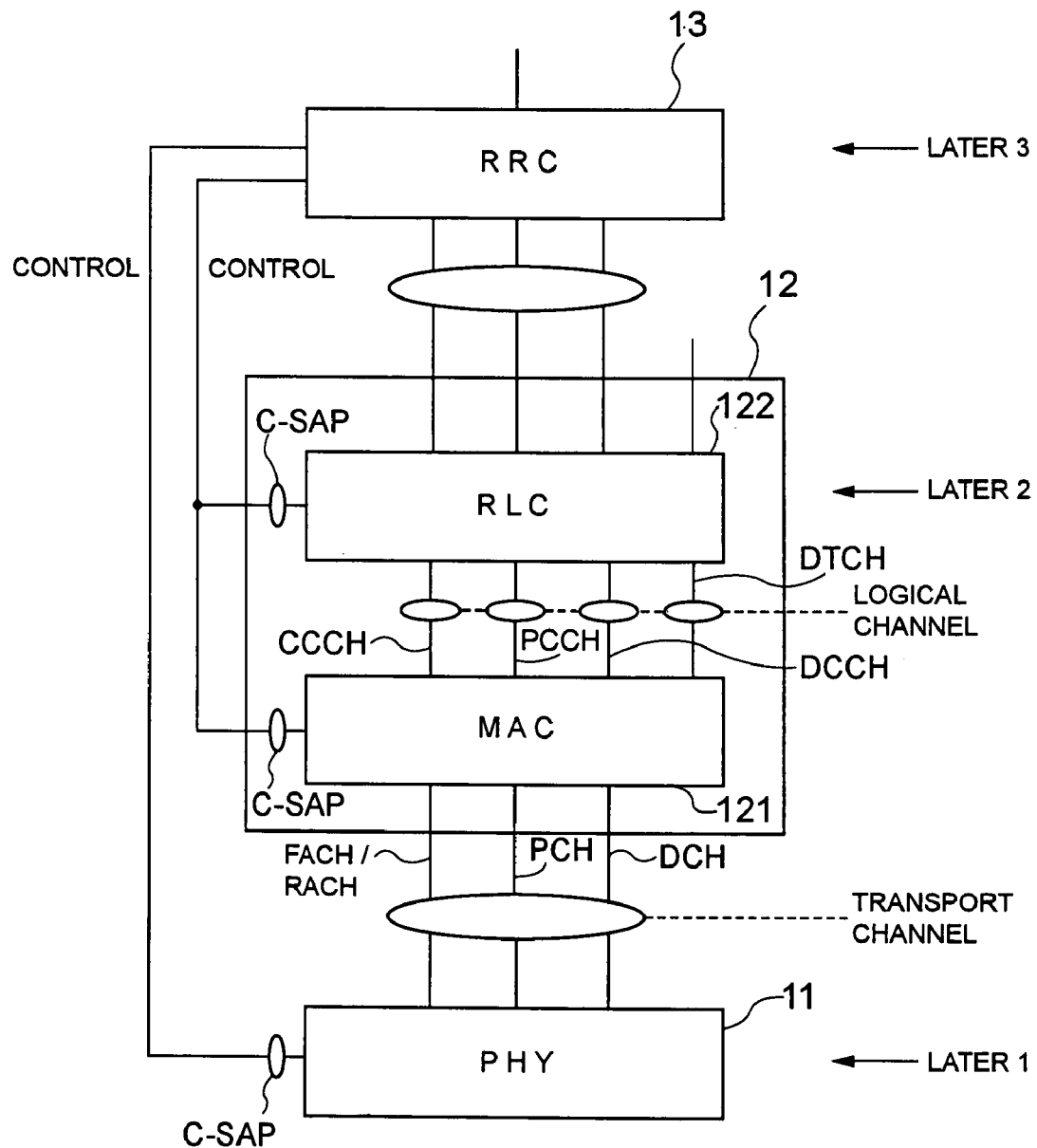

MOBILE COMMUNICATION SYSTEM AND OPERATION CONTROL METHOD THEREOF

BACKGROUND OF THE INVENTION

1. Field of the Invention

The present invention relates to a mobile communication system and an operation control method thereof, and more particularly, to a congestion control method of a radio access network system in a W-CDMA (Wideband-Code Division Multiple Access) communication system.

2. Description of the Prior Art

An architecture of a W-CDMA communication system including a mobile communication system is shown in FIG. 18. A radio access network (RAN) 1 is configured with radio network controllers (RNC) 4, 5 and Node B6 to 9, and is connected with a core network (CN) 3 as an switching network via an Iu interface. The Node B6 to 9 are logical nodes for radio transmission/reception, and more specifically, are radio base stations.

An interface between the Node B and RNC is referred to as an Iub, and an Iur interface is also standardized as an interface between RNCs. Each Node B covers one or more cells 10 and is connected to a mobile unit (UE) 2 via a radio interface. The Node B terminates a radio line, and the RNC manages the Node B and selectively combining and splitting radio paths. Note here that the detail of the architecture shown in FIG. 18 is specified in 3GPP (3rd Generation Partnership Projects).

FIG. 19 shows a protocol architecture of the radio interface in the W-CDMA communication system shown in FIG. 18. As shown in FIG. 19, the protocol architecture is composed of three protocol layers of a physical layer (PHY) 11 denoted as Layer 1, a data link layer 12 denoted as Layer 2, and a network layer (RRC: Radio Resource Control) 13 that is an upper layer of the data link layer 12 and is denoted as Layer 3. The data link layer of Layer 2 includes two sublayers of a MAC (Media Access Control) layer 121 and an RLC (Radio Link Control) layer 122.

An ellipse shown in FIG. 19 indicates a service access point (SAP) between layers or sublayers, where the SAP between the RLC sublayer 122 and the MAC sublayer 121 provides a logical channel. That is, the logical channel is provided from the MAC sublayer 121 to the RLC sublayer 122, and is classified by functions and logical characteristics of a transmission signal and characterized by contents of transferred information. The logical channel includes, for example, a common channel of CCCH (Common Control Channel), a paging channel of PCCH (Paging Control Channel), dedicated channels of DCCH (Dedicated Control Channel) and DTCH (Dedicated Traffic Channel), or the like.

The SAP between the MAC sublayer 121 and the physical layer 11 of Layer 1 provides a transport channel which is supplied from the physical layer 11 to the MAC sublayer 121. The transport channel is classified by a transmission form and is characterized depending on how and what information is transmitted via the radio interface. The transport channel includes, for example, a FACH (Forward Access Channel), a RACH (Random Access Channel), a PCH (Paging Channel), a DCH (Dedicated Channel), or the like.

The physical layer 11 and the data link layer 12 are controlled by the network layer (RRC) 13 via a C-SAP providing a control channel. The detail of the protocol architecture shown in FIG. 19 is specified in ARIB STD-T36-25.301v.3.8.

In the foregoing conventional art, there exists a C (Control) plane that controls signaling, and a U (User) plane that transports user data.

The RNCs 4, 5 of the radio access network (RAN) 1 in the conventional art are devices in each of which a processing function of controlling the C plane and a processing function of controlling the U plane are physically integrated. By using such a single device having the both processing functions integrated, a radio bearer service is provided to a terminal which is a mobile unit.

In the mobile communication system including such a conventional RNC that integrally has functions of U plane and C plane, if we need to enhance the function of the C plane, however the RNC itself should be added in the system. In the some way, if we need to enhance the function of the U plane, however the RNC itself should be added in the system. Therefore, the conventional RNC constitution makes constructing a system with high scalability quite difficult.

Moreover, there has been widespread data communication and image communication including moving pictures by using portable information terminals such as mobile telephones, notebook-sized personal computers, or the like, according to which user data transmitted through communication circuits increase in amount. This may consequently increase loads on a device handling the user data in the radio access network (RAN), causing a congestion state locally or system down in the worst case. Therefore, there now appeared the necessity of performing load distribution processing while continuing the processing for user data without causing system down even in the congestion state.

BRIEF SUMMARY OF THE INVENTION

The present invention was proposed to address the above demand and an object thereof resides in providing a mobile communication system capable of performing load distribution processing while continuing user data processing without causing system down even when congestion occurs due to increasing communication data, and in providing an operation control method for the system.

The mobile communication system of the present invention includes first and second user plane processing means for performing processing to control transfer of user data in relation to a mobile unit, and control plane processing means for processing to control transfer of signaling having a control signal, which is physically separated from the first and second user plane processing means and is provided in an upper position of the first and second user plane processing means, and when detecting a congestion state of processing, the first user plane processing means transfers a part of the processing to the second user plane processing means.

The first user plane processing means is an active system connected to a radio base station, and the second user plane processing means is a backup system for the first user plane processing means. In this case, the first user plane processing means comprises means for, in response to the detection of the congestion state, controlling so as to switch a transmission/reception destination of the control signal and the user data to the second user plane processing means as well as transmitting a switching direction to the second user plane processing device, and means for notifying the second user plane processing means of information necessary for processing transferred to the second user plane processing means. Furthermore, the second user plane processing means comprises means for inheriting over the information in response to the notice of the information as well as processing the control signal and the user data in response to reception of the switching direction.

Moreover, the radio base station is present in a first communication network, the first and second user plane processing means and the control plane processing means are connected to a second communication network different from the first communication network, and the first user plane processing means further comprises conversion interface means between the first and second communication networks. Furthermore, the second user plane processing means transmits and receives the control signal and the user data via the conversion interface means in the first user plane processing means, and the first communication network includes an ATM communication network and the second communication network includes an IP communication network.

The operation control method according to the present invention is an operation control method in a mobile communication system which includes first and second user plane processing means for processing to control transfer of user data in relation to a mobile unit and control plane processing means for processing to control transfer of signaling having a control signal, which is physically separated from the first and second user plane processing means and is provided in an upper position of the first and second user plane processing means, wherein the first user plane processing means executes a step of, when a congestion state of processing is detected, transferring a part of the processing to the second user plane processing means.

Furthermore, the first user plane processing means is an active system connected to a radio base station, and the second user plane processing means is a backup system for the first user plane processing means. In this case, the first user plane processing means further executes a step of, in response to the detection of the congestion state, controlling so as to switch a transmission/reception destination of the control signal and the user data to the second user plane processing means, a step of transmitting a switching direction to the second user plane processing means, and a step of notifying the second user plane processing means of information necessary for processing transferred to the second user plane processing means. In addition, the second user plane controlling means executes a step of inheriting the information in response to the notice of the information, and a step of processing the control signal and the user data in response to reception of the switching direction.

Moreover, the radio base station is present in a first communication network, the first and second user plane processing means and the control plane processing means are connected to a second communication network different from the first communication network, and the first user plane processing means further executes a step of performing interface conversion between the first and second communication networks. Furthermore, the second user plane processing means transmits and receives the control signal and the user data via the step of performing the interface conversion in the first user plane processing means.

According to the present invention, an ATM (Asynchronous Transfer Mode) network used in a radio access network (RAN) of a W-CDMA communication system is IP (Internet Protocol)-networked, where a C plane processing function (C plane processing device) for signaling processing and a U plane processing function (U plane processing device) for user data processing are constituted to be physically separated from each other, and an active system and a backup system are prepared for the U plane processing device so that (part of) processing may be switched to and inherited by the backup system device when congestion occurs in the U plane processing device of the active system.

At this time, the backup system device first receives various kinds of information necessary for the processing that it is to inherit, and then inherits the processing by using such various information.

A network used in the radio access network is IP-networked, where an IP address is assigned in advance to each of the U plane processing device and C plane processing device, there by allowing the handling of these processing devices equivalently to other devices in the IP network. However, the Node B for providing a radio bearer to the mobile unit belongs to the ATM network, so the U plane processing device of the active system is provided with an interface part for ATM/IP conversion that has an interface function with the Node B, to thereby achieve mutual conversion function between an ATM packet and an IP packet.

BRIEF DESCRIPTION OF THE DRAWINGS

FIG. 19 is a diagram showing a protocol architecture in a RAN of FIG. 18.

DETAILED DESCRIPTION OF THE PREFERRED EMBODIMENTS

Figure 1:
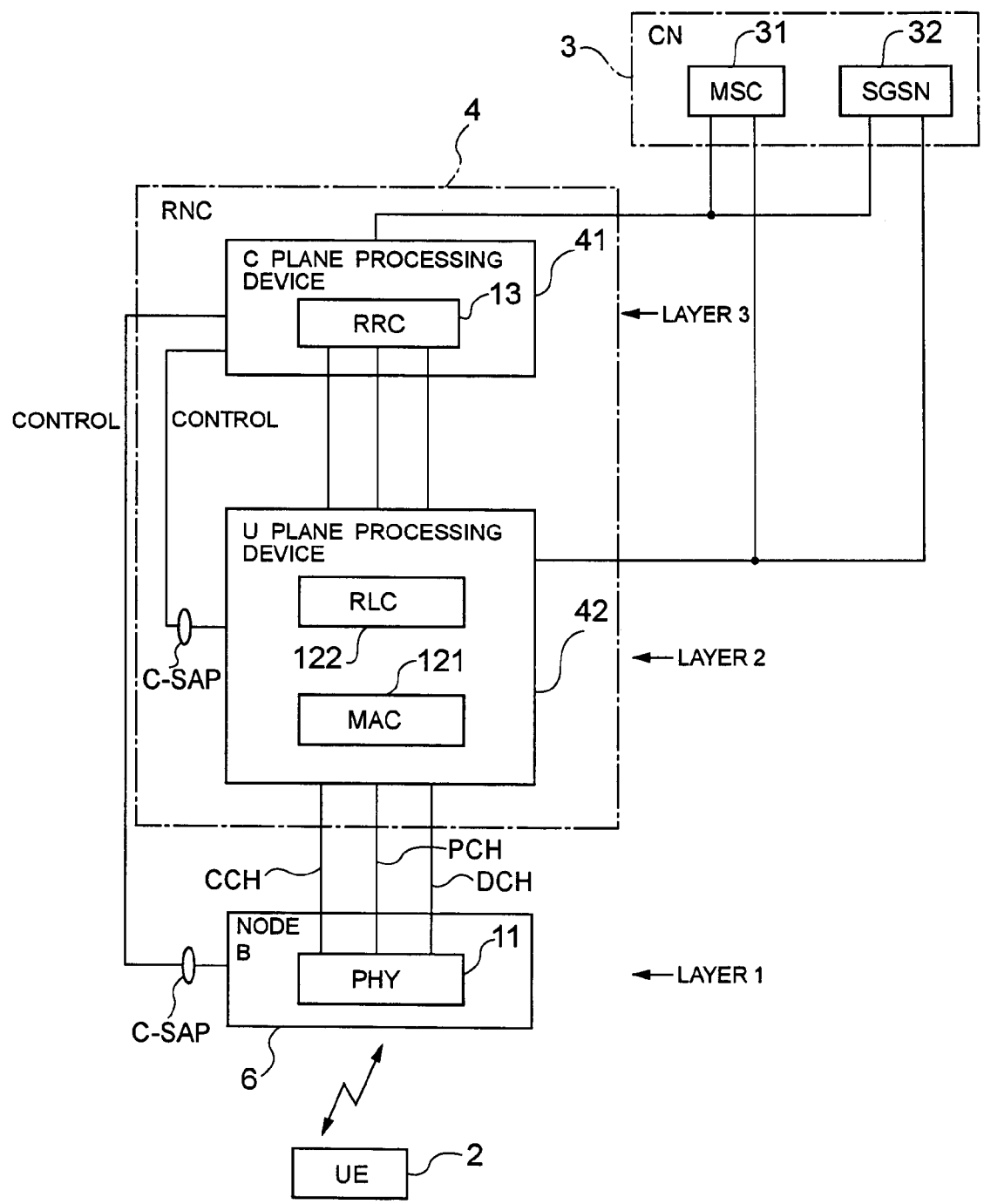
FIG. 1 is a schematic system diagram including a C plane processing device and a U plane processing device used in an embodiment of the present invention.

An embodiment of the present invention will be described in detail below with reference to the drawings. FIG. 1 is a schematic diagram illustrating a constitution of an RNC 4 applied to the embodiment of the present invention. As shown in FIG. 1, the RNC 4 is so constituted that a C plane processing device 41, which is equivalent to a processing function part responsible for a C plane for controlling signaling, and a U plane processing device 42, which is equivalent to a processing function part responsible for a U plane for transfer of user data, are separated from each other.

More specifically, the C plane processing device 41 has a function of generating and terminating an RRC massage in Layer 3 of an RRC layer 13, and the U plane processing device 42 has functions for which layer 2 of a MAC layer 121 and an RLC layer 122 are responsible. An RRC signaling between a mobile unit (UE) 2 and the RNC 4 is transferred to the RRC layer 13 in the C plane processing device 41 positioned as an upper layer after the use of the functions offered by the MAC layer 121 and the RLC layer 122 in the U plane processing device 42.

Accordingly, in the existing RNC protocol architecture shown in FIG. 19, the physical layer (PHY) 11 denoted as Layer 1, the data link layer 12 denoted as Layer 2, and the network layer 13 denoted as Layer 3 are separated into a Node B (radio base station) 6, the U plane processing device 42, and the C plane processing device 41, respectively. In FIG. 1, the connectivity between the MAC layer 121 and the RLC layer 122 is the same as in the example of FIG. 19, so is omitted.

The RRC layer 13 in the C plane processing device 41 controls the physical layer 11 in the Node B, and the MAC layer 121 and the RLC layer 122 in the U plane processing device 42, by using a C-SAP (Control Service Access Point) that provides a control channel. A signaling between the RNC 4 and each of a MSC (Mobile Switching Center) 31 and a SGSN (Serving GPRS (Global Packet Radio Service) Switching Node) 32 is terminated for processing in the C plane processing device 41.

Figure 18:
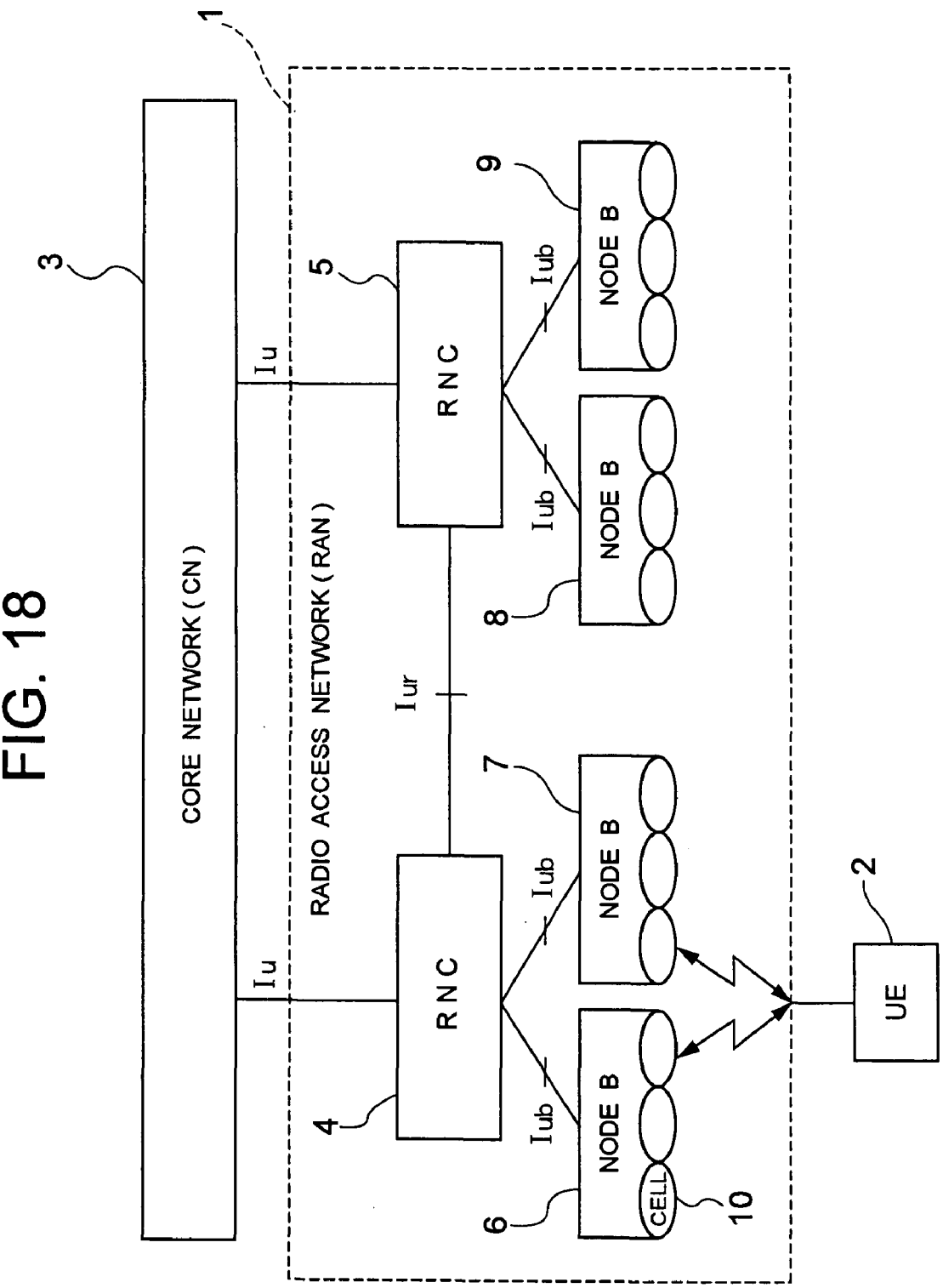
FIG. 18 is a diagram showing a system architecture in a W-CDMA communication system.

The MSC 31 has a line switching function and the SGSN 32 has a packet switching function, both of which are included in the core network (CN) 3 shown in FIG. 18. User information is transferred via the U plane processing device 42 between the mobile unit (UE) 2 and each of the MSC 31 and SGSN 32.

The constitution of the device shown in FIG. 1 makes it possible to configure a system with high scalability. That is, only the C plane processing device 41 may be added to enhance signaling processing capability, and only the U plane processing device 42 may be added to increase transfer speed of user data. In addition, every device having each function in the U plane processing device 42 has no relation with each other and is controlled by the RRC 13 in the C plane processing device 41, which thus enables the implementation as an independent device.

Figure 2:
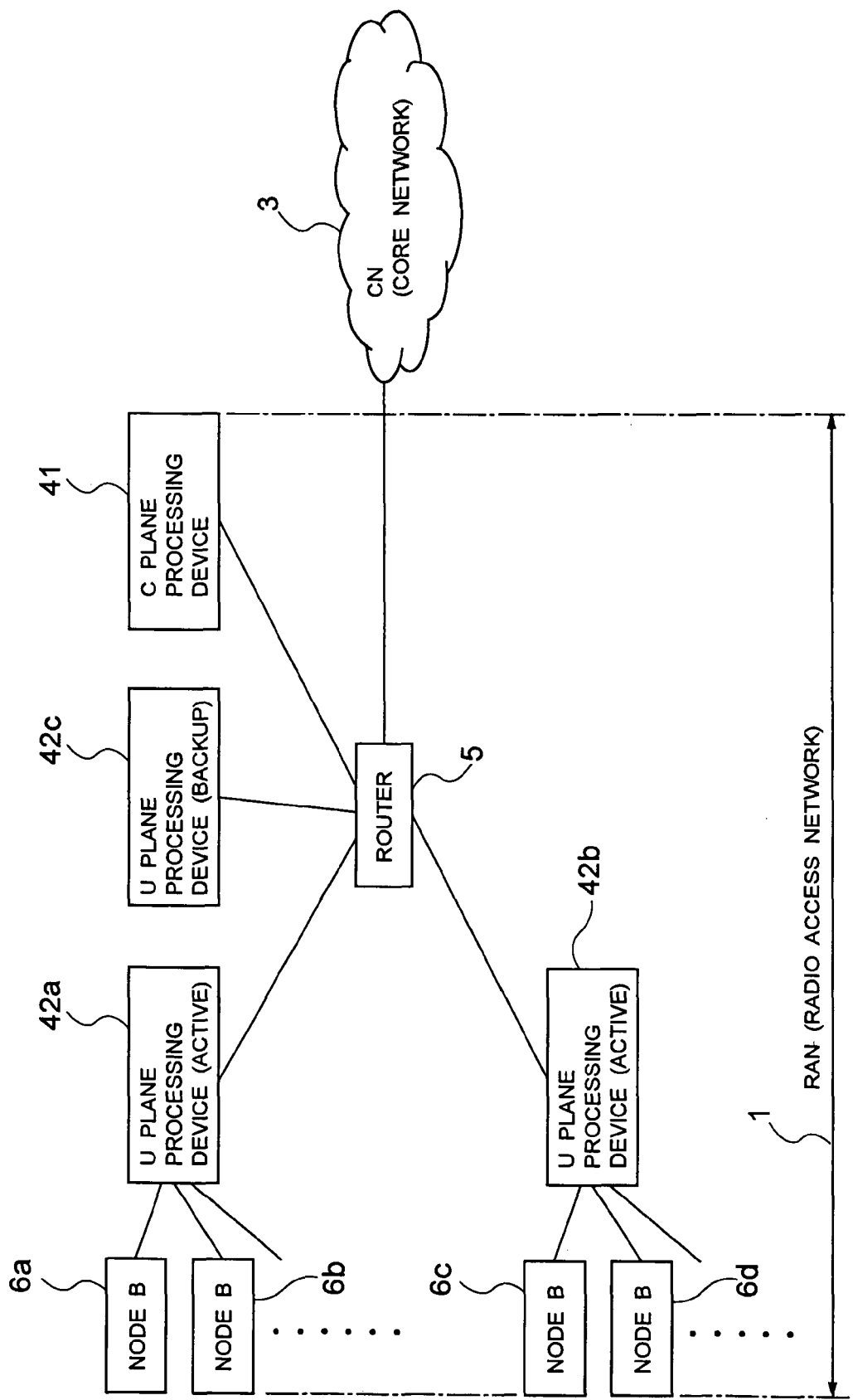
FIG. 2 is a schematic block diagram in the embodiment of the present invention.

FIG. 2 is a schematic system diagram in the embodiment of the present invention. Referring to FIG. 2, the RAN (radio access network) is IP-networked, where an IP address is assigned in advance to each device described in the following. Both U plane processing devices 42a and 42b operate as an active system, and in subordination thereto, a plurality of Node B 6a to 6d are connected.

As a backup for the active U plane processing devices 42a and 42b, which is used in the case of congestion, another U plane processing device 42c is provided. Besides, the C plane processing device 41 is provided in the upper position of these U plane processing devices 42a to 42c, and each of these devices are connected via a router 5 to the core network (CN) 3 operating as a host system.

The backup U plane processing device 42c monitors, in a normal state, control signals for signaling transfered between the active U plane processing device 42a and the C plane processing device 41, and user data transfered between the U plane processing device 42a and the core network 3. When the processing of the active U plane processing device 42a goes into the congestion state, part of the processing of the U plane processing device 42a is inherited by the backup U plane processing device 42c in order to distribute loads of the U plane processing device 42a. Also when the congestion occurs on processing in the other active U plane processing device 42b, part of the processing of the U plane processing device 42c is inherited by the backup U plane processing device 42c. The part of the processing means some of a plurality of calls (call unit) currently being connected.

Figure 3:
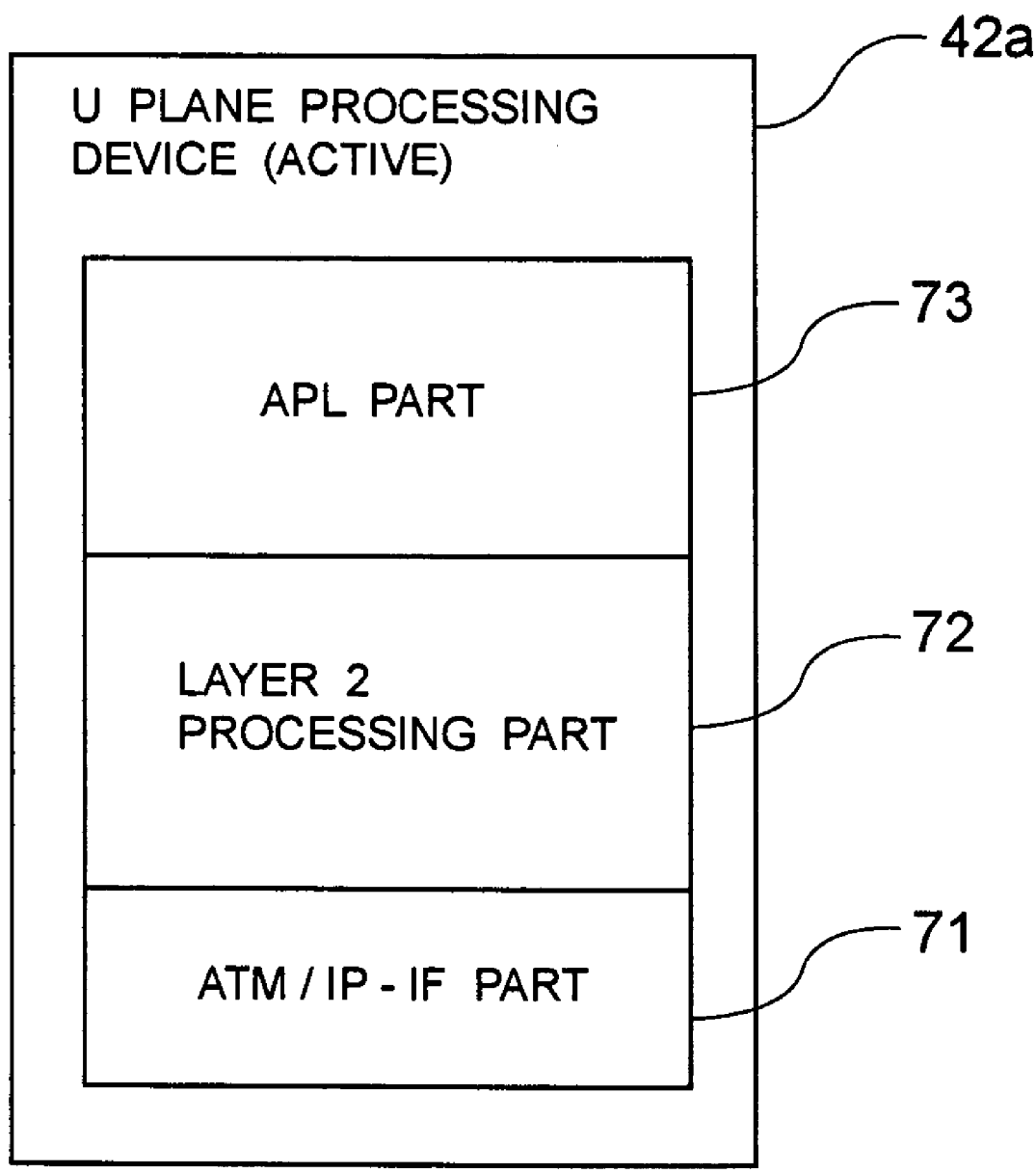
FIG. 3 is a block diagram of an active U plane processing device in FIG. 2.
Figure 4:
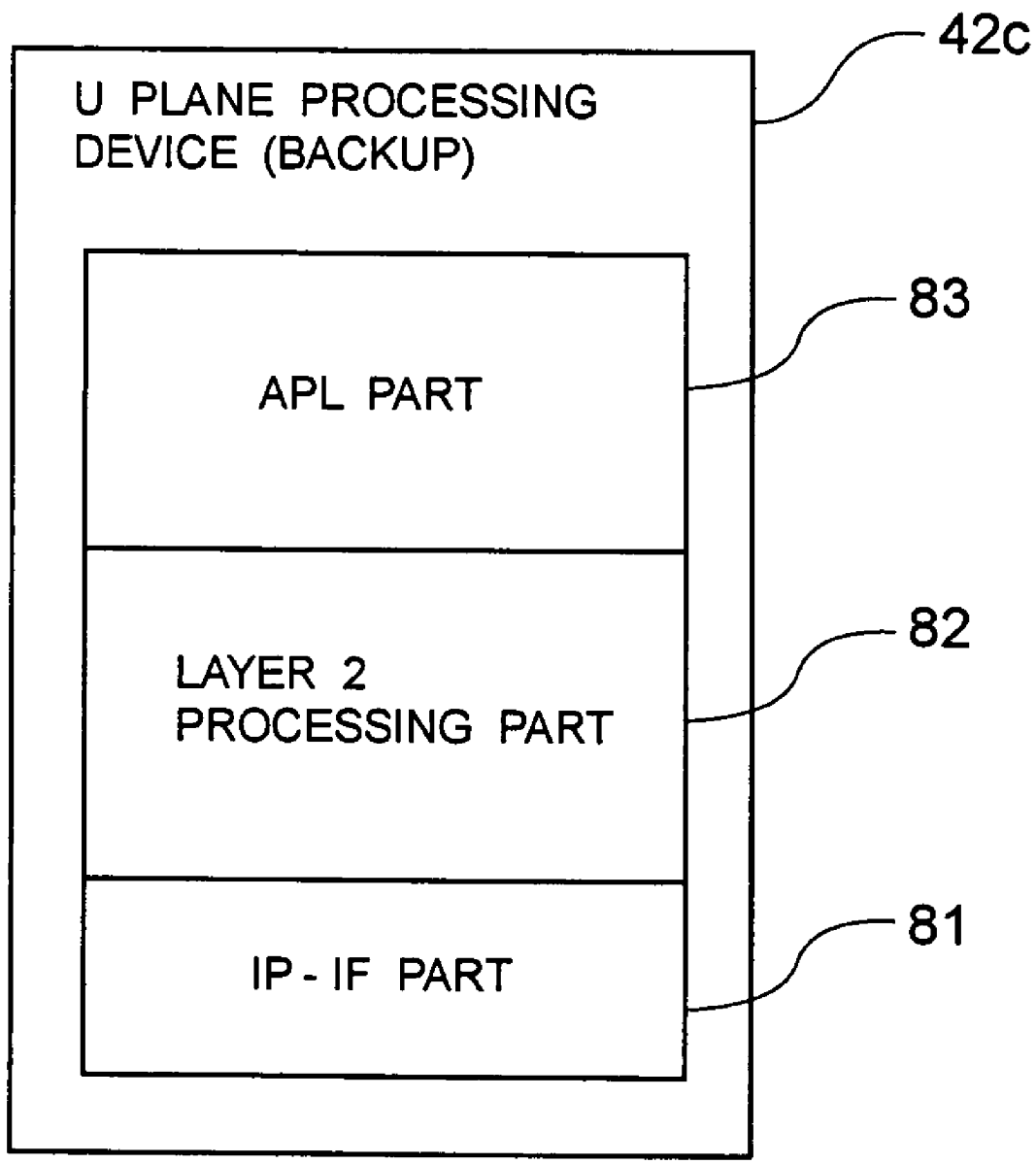
FIG. 4 is a block diagram of a backup U plane processing device in FIG. 2.

FIG. 3 is a schematic functional block diagram of the active U plane processing device 42a, and FIG. 4 is a schematic functional block diagram of the backup U plane processing device 42c. Referring to FIG. 3, the active U plane processing device 42a comprises an ATM/IP-IF (interface) part 71, a Layer 2 processing part 72, and an APL (application part) 73. The ATM/IP-IF part 71 has a function of converting a data packet transmitted between an IP network involving the radio access network (RAN) 1 and an ATM network involving the Node B6a to 6d corresponding to the physical layer composing a lower protocol layer (Layer 1).

More specifically, the ATM/IP-IF part 71 has a function of converting ATM packets input from the Node B to IP packets to transfer them to the Layer 2 processing part 72 or the router 5, and a function of also converting IP packets input from the Layer 2 processing part 72 or the router 5 to ATM packets to transfer them to the Node B, and further has a function of switching a transfer destination of IP packets to either the Layer 2 processing part 72 or the backup U plane processing device 42c in accordance with directions from the APL part 73.

Figure 5:
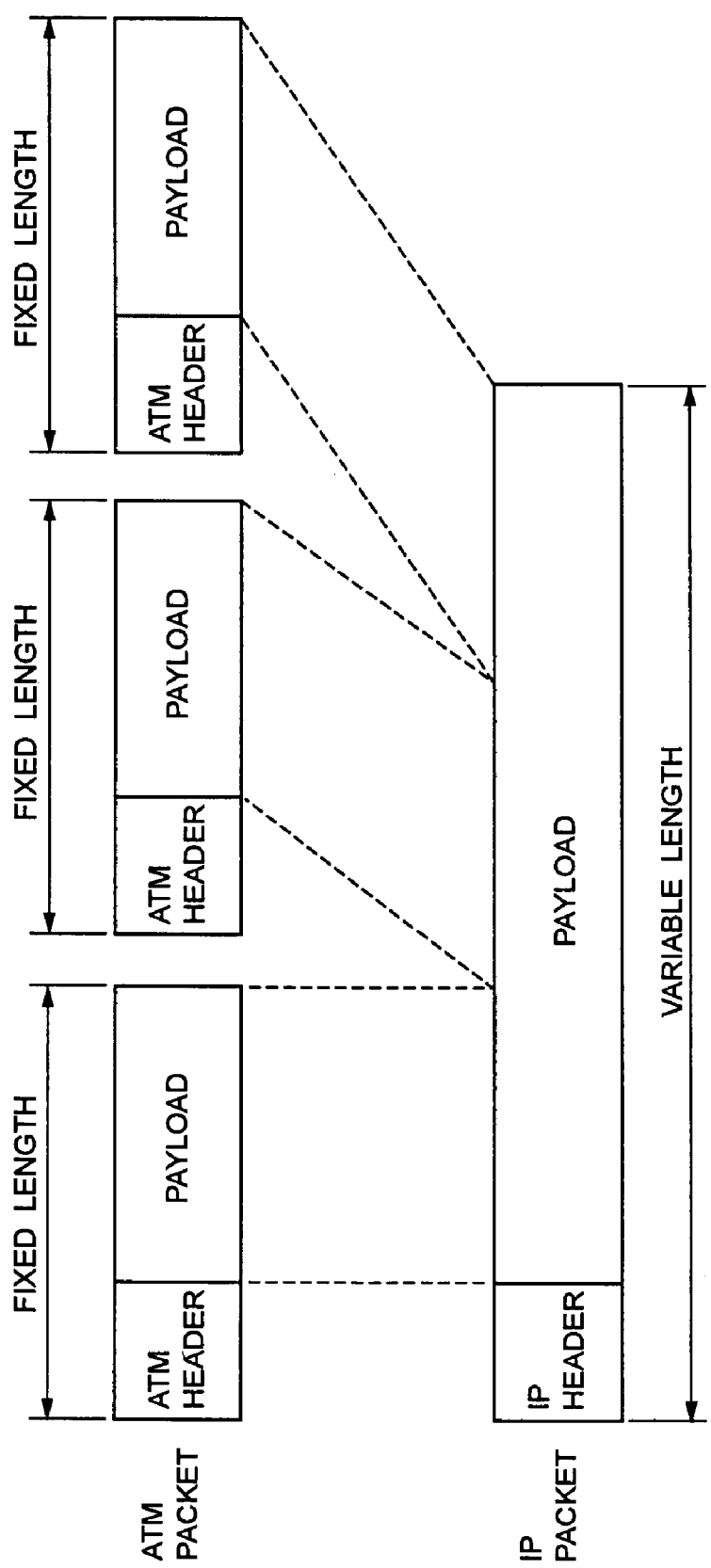
FIG. 5 is a packet format diagram showing an example of ATM/IP packet conversion.

FIG. 5 is an image diagram showing an example of data conversion between the ATM packets and IP packet. Fixed length of multiple packets (cell) is transmitted in the ATM network, and a variable length packet is transmitted in the IP network. Therefore, when the ATM packets are converted to the IP packet, multiple payloads on the ATM packets are integrated together, and thereafter an IP header is added thereto, as shown in FIG. 5. Contrary to this, when the IP packet is converted to the ATM packets, a payload portion on the IP packet is divided in the fixed length, and thereafter an ATM header is added to each packet.

At this time, the ATM/IP-IF part 71 holds in advance as internal data, a table for converting ATM header information (ATM address of VPI, VCI, etc.) to IP header information (IP address) or vice versa.

The Layer 2 processing part 72 has a function of performing protocol processing of the MAC layer 121 and the RLC layer 122 shown in FIG. 1 for signals from the ATM/IP-IF part 71, and then outputting to the ATM/IP-IF part 71. The APL part 73 has a function of managing each lower protocol, a function of detecting congestion, a function of directing the ATM/IP-IF part 71 to switch a transmission/reception destination of control signals and user data to the backup U plane processing device 42c when detecting the congestion, and a function of notifying the backup U plane processing device 42c of information about calls (hereinafter referred to as call information) necessary for call processing to be inherited when detecting the congestion, the call information which is held by each protocol for every call, every cell, and every Node B.

Figure 6:
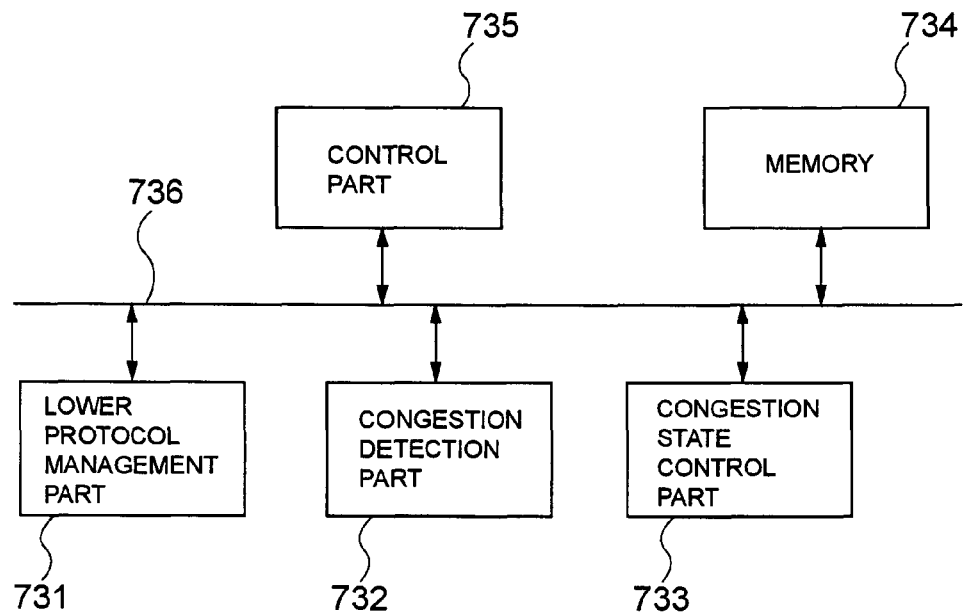
FIG. 6 is a functional block diagram of an APL part 73 in FIG. 3.

Each function of the APL part 73 is executed by an application program, which means that these functions are realized by making the CPU read and execute this application program. FIG. 6 shows these functions by a functional block. That is, the APL part 73 includes a lower protocol management part 731, a congestion detection part 732, a congestion state control part 733 for controlling as described above at the time of congestion, a memory 734 for storing programs, data, and the like, a control part 735 for controlling these parts, and a bus 736 for connecting these parts.

The backup U plane processing part 42c comprises an IP-IF part 81, a Layer 2 processing part 82, and an APL part 83 as shown in FIG. 4. The IP-IF part 81 has a function of transferring signals received from the ATM/IP-IF part 71, the C plane processing device 41, and the core network 3 to the Layer 2 processing part 82, according to the direction from the APL part 83 during the congestion, a function of also transferring signals received from the Layer 2 processing part 82 to the ATM/IP-IF part 71, the C plane processing device 41, and the core network 3, and further has a function of monitoring control signals and user data transmitted between the U plane processing device 42a and the C plane processing device 41, and between the U plane processing device 42a and the core network 3.

The Layer 2 processing part 82 has the same function as that of the Layer 2 processing part 72 in the active U plane processing device 42a shown in FIG. 3. The APL part 83 has a function of managing lower protocols, a function of receiving a switching request of processing directed from the U plane processing device 42a and the call information held by each protocol, and a function of developing the received and inherited information of each protocol in the lower protocols.

Figure 7:
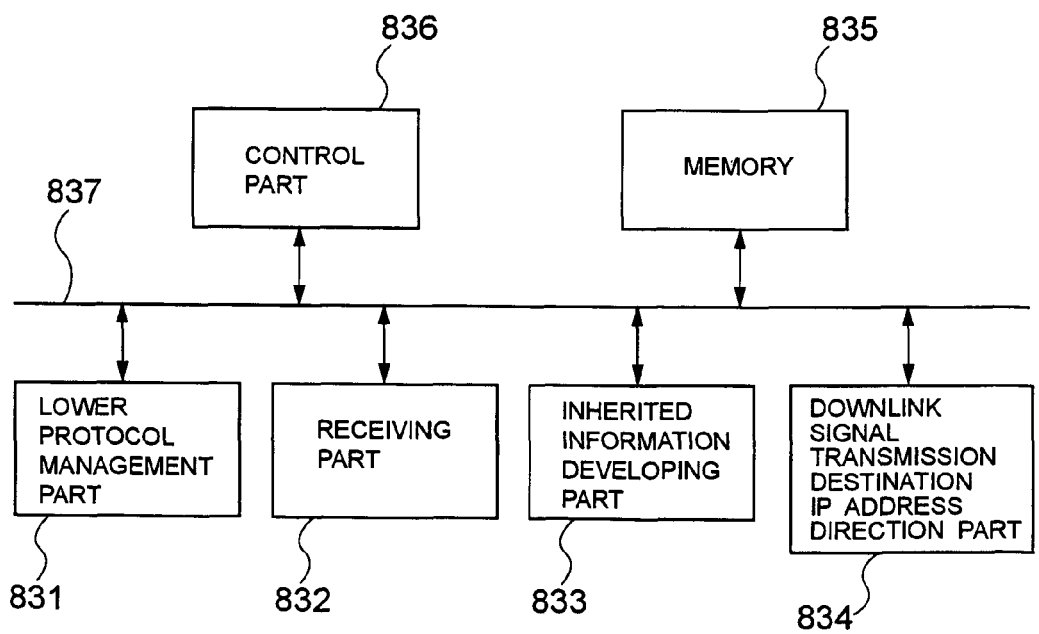
FIG. 7 is a functional block diagram of an APL part 83 in FIG. 4.

Each function of the APL part 83 is executed by an application program similarly to the APL part 73 in FIG. 3, and is indicated by a functional block as shown in FIG. 7. That is, the APL part 83 includes a lower protocol management part 831, a receiving part 832 for receiving the switching request and information inherited from the U plane processing device 42a, an inherited information developing part 833 for developing the inherited information of each protocol in the lower protocols, a downlink signal transmission destination IP address direction part 834 for directing the C plane processing device 41 and the CN 3 to change the IP address of transmission destination of downlink control signals or user data of calls to be inherited, to an IP address of the backup U plane processing device 42c, a memory 835 for storing programs, data, and the like, a control part 836 for controlling these parts, and a bus 837 for connecting these parts.

Figure 8:
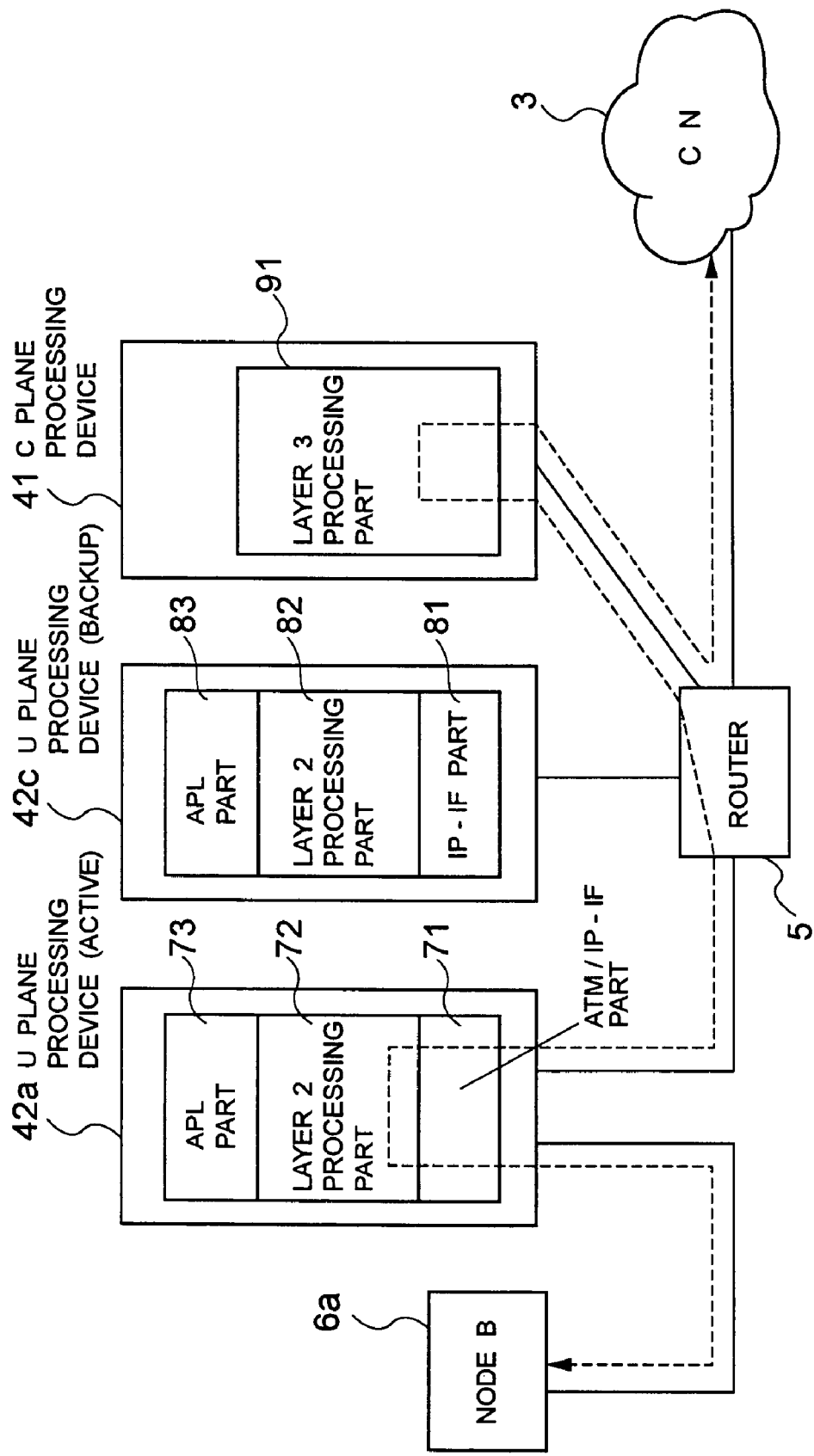
FIG. 8 is a diagram showing a flow of a control signal (C plane information) in a normal operation state in the embodiment of the present invention.
Figure 9:
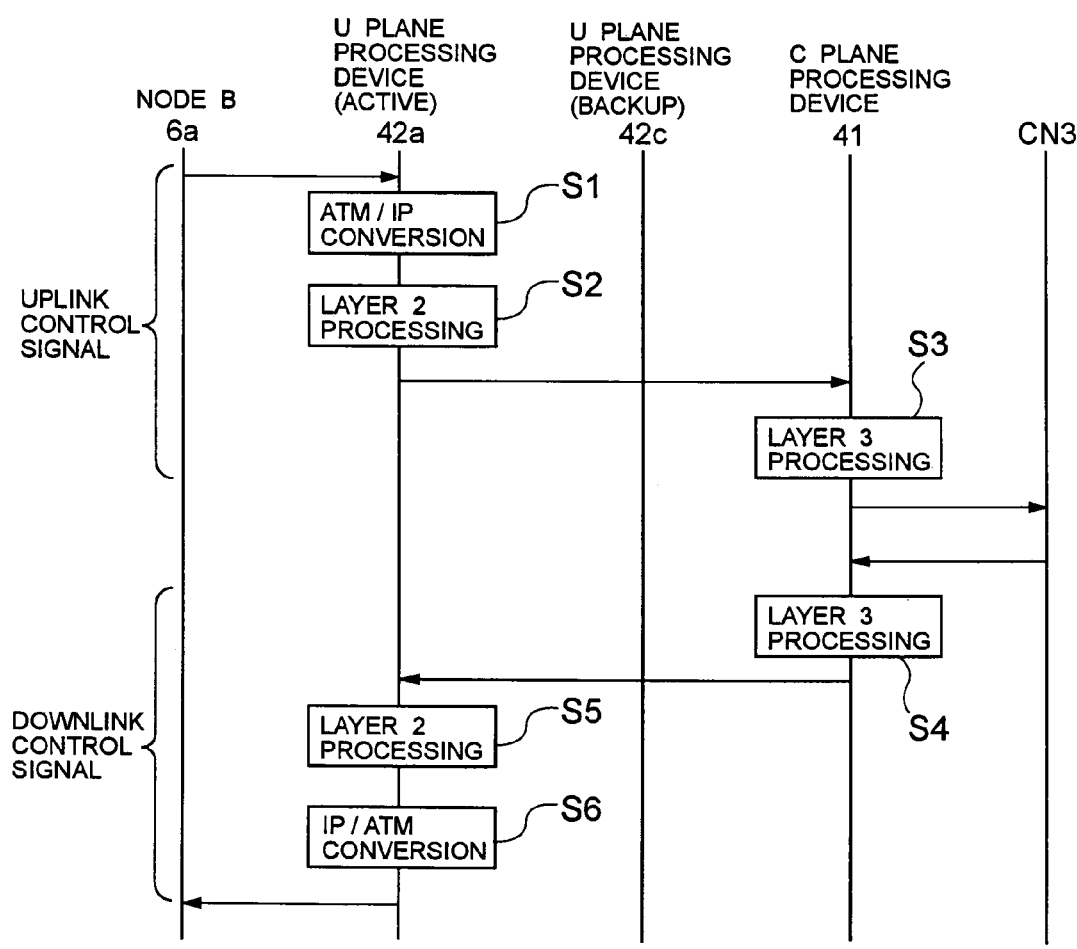
FIG. 9 is an operational sequence diagram in the case shown in FIG. 8.

In the following, operations in the embodiment of the present invention will be described. FIG. 8 is a diagram showing a flow of the uplink and downlink control signals (C plane information) when the active U plane processing device 42a is not in the congestion state but in the normal state, and indicates the flow by a dotted line. FIG. 9 is an operational sequence diagram in this case.

Referring to FIGS. 8 and 9, when the processing of the active U plane processing device 42a is not in the congestion state, the uplink control signal received from the Node B6a, for example, is converted from the ATM packet to the IP packet in the ATM/IP-IF part 71 (step S1), and is subjected to Layer 2 processing by the Layer 2 processing part 72 (step S2), then transferred to the C plane processing device 41 to be subjected to Layer 3 processing therein (step S3). Finally, it is transmitted to the CN 3.

The downlink control signal is transmitted from the CN 3 to the C plane processing device 41, and is subjected to the Layer 3 processing (step S4). Then, it is transferred to the U plane processing device 42a for the Layer 2 processing in the Layer 2 processing part 72 (step S5), and finally transmitted to the Node B6a after converted from the IP packet to the ATM packet in the ATM/IP-IF part 71 (step S6). At this moment, the backup U plane processing device 42c monitors the control signals transmitted between the C plane processing device 41 and the U plane processing device 42a.

Figure 10:
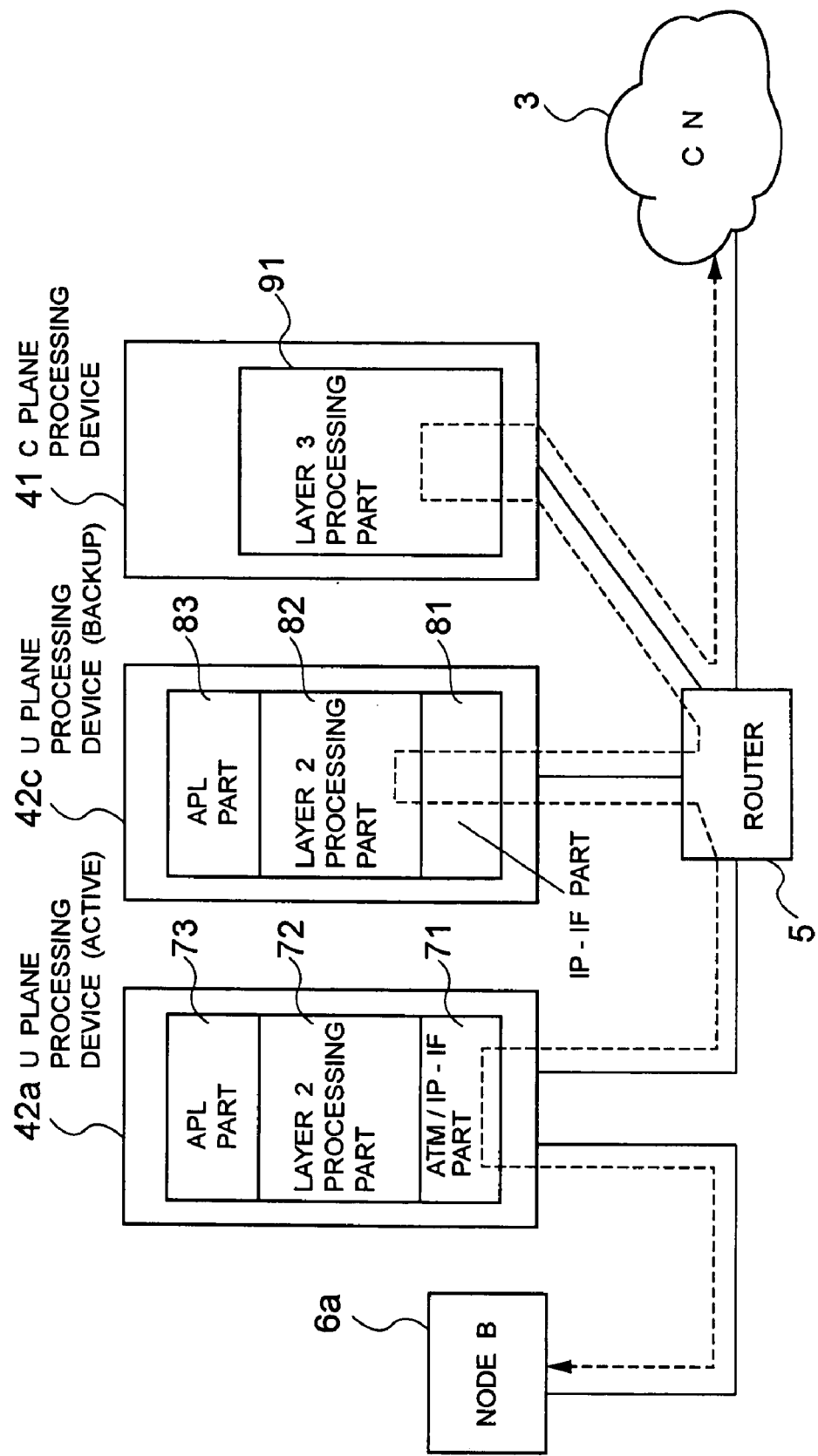
FIG. 10 is a diagram showing a flow of the control signal (C plane information) in a congestion state in the embodiment of the present invention;.
Figure 11:
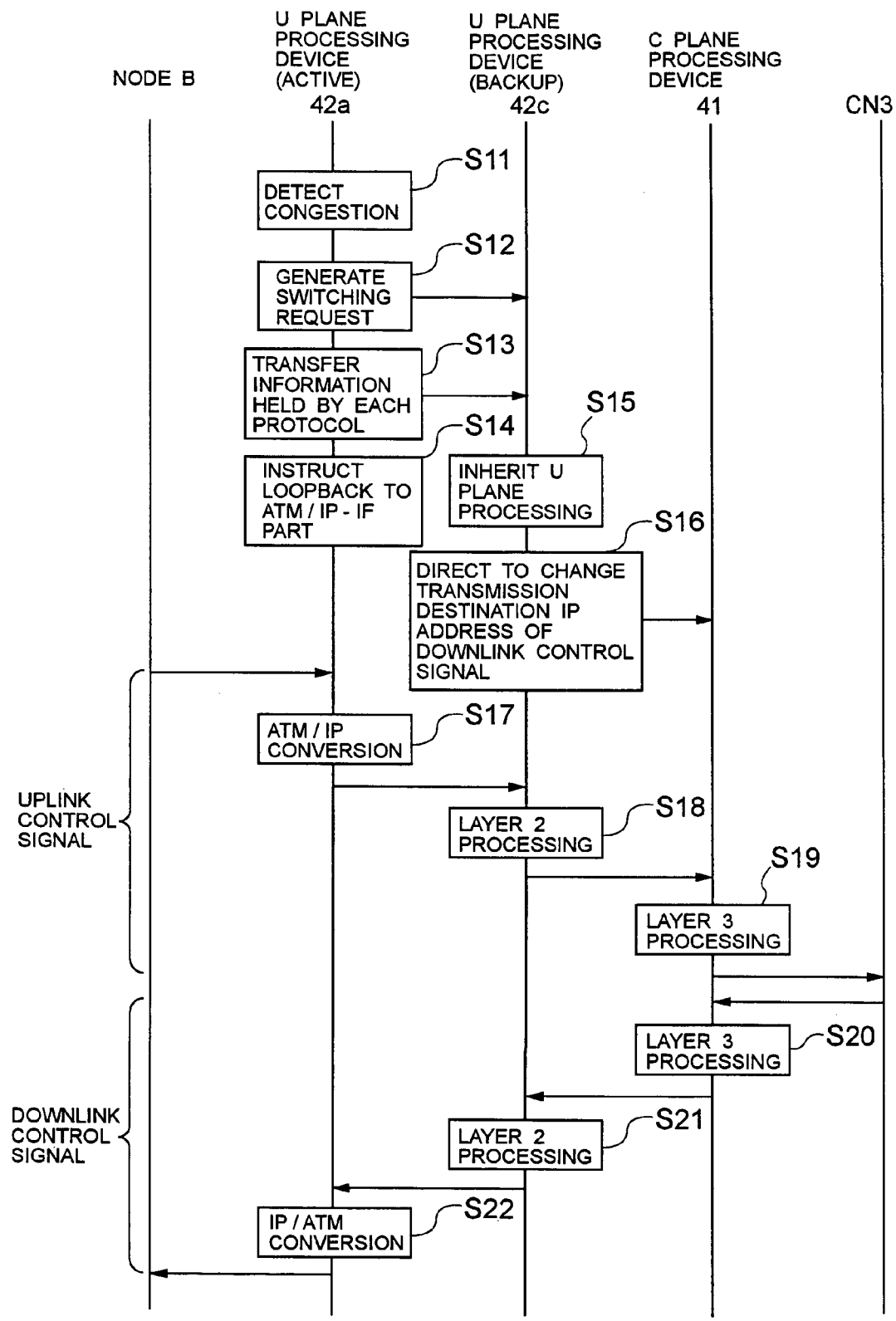
FIG. 11 is an operational sequence diagram in the case shown in FIG. 10.

FIGS. 10 and 11 show a flow of control signals and an operational sequence, respectively, when the U plane processing device 42a is in the congestion state. Now, when the processing in the U plane processing device 42a goes into the congestion state, the congestion detection part 732 in FIG. 6 detects it (step S11), and part of the processing, that is, processing for some calls out of those currently being connected is switched to the backup U plane processing device 42c, whereupon the switching request to switch the processing from the U plane processing device 42a to the backup U plane processing device 42c is generated (step S12), and call information of calls to be inherited, which is held by each protocol, is transferred to the backup U plane processing device 42c by the congestion state control part 733 (step S13). Simultaneously with this, the control signals are so controlled by the congestion state control part 733 that they may not be transmitted to the upper protocol Layer 2 processing part 72 but may be looped back in the ATM/IP-IF part 71 (step S14).

Next, the backup U plane processing device 42c having received the switching request of processing from the U plane processing device 42a inherits the call processing on the basis of information hitherto monitored and the call information transferred in step S13 (step S15). This inheritance is allowed when the inherited information developing part 833 shown in FIG. 7 develops the call information in Layer 2 protocols.

Then, the backup U plane processing device 42c directs the C plane processing device 41 by the downlink signal transmission destination IP address direction part 834 shown in FIG. 7 to change the transmission destination IP address of the downlink control signal of calls to be inherited from the IP address of the active U plane processing device 42a to the IP address of the backup U plane processing device 42c (step S16). Therefore, the C plane processing device 41 has a function of changing the transmission destination IP address of the downlink control signal for every call according to the direction from the backup U plane processing part 42c.

At this time, the uplink control signal which is transferred from the U plane processing device 42a undergoes the ATM/IP conversion in the ATM/IP-IF part 71 of the U plane processing device 42a (step S17) and also the IP address of the IP header part (see FIG. 5) is changed to the IP address of the backup U plane processing device 42c and transmitted. In accordance with this IP address, the backup U plane processing device 42c takes in the uplink control signal of takeover processing into the IP-IF part 81 to perform the Layer 2 processing at the Layer 2 processing part 82 (step S18). Then, the uplink control signal is subjected to the Layer 3 processing in the C plane processing device 41 (step S19), and finally transmitted to the CN3.

On the other hand, the downlink control signal from the CN 3 undergoes the Layer 3 processing in the C plane processing device 41 (step S20), and it is transmitted from the C plane processing device 41 with the designated IP address of the backup U plane processing device 42c in place of the IP address of the active U plane processing device 42a, so that the backup U plane processing device 42c takes in the downlink control signal designating the device 42c by distinguishing the IP address in the IP header of the downlink control signal.

The downlink control signal thus taken in by the backup U plane processing device 42c undergoes the Layer 2 processing in the Layer 2 processing part 82 (step S21), and then transmitted to the ATM/IP-IF part 71 of the U plane processing device 42a. In the ATM/IP-IF part 71, the downlink control signal is subjected to the IP/ATM conversion (step S22), and then finally transmitted to the Node B.

Figure 12:
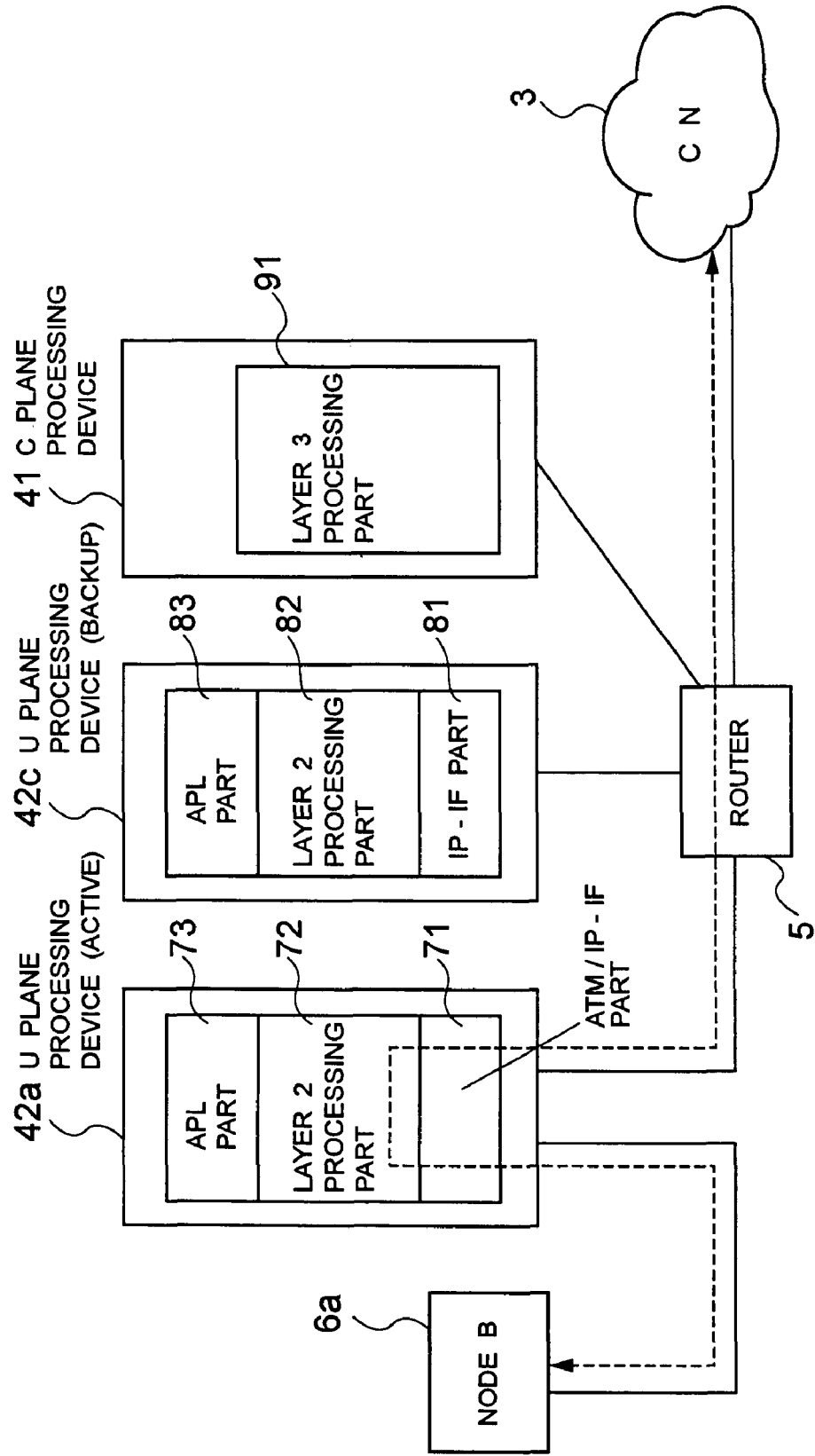
FIG. 12 is a diagram showing a flow of user data in the normal operation state in the embodiment of the present invention.
Figure 13:
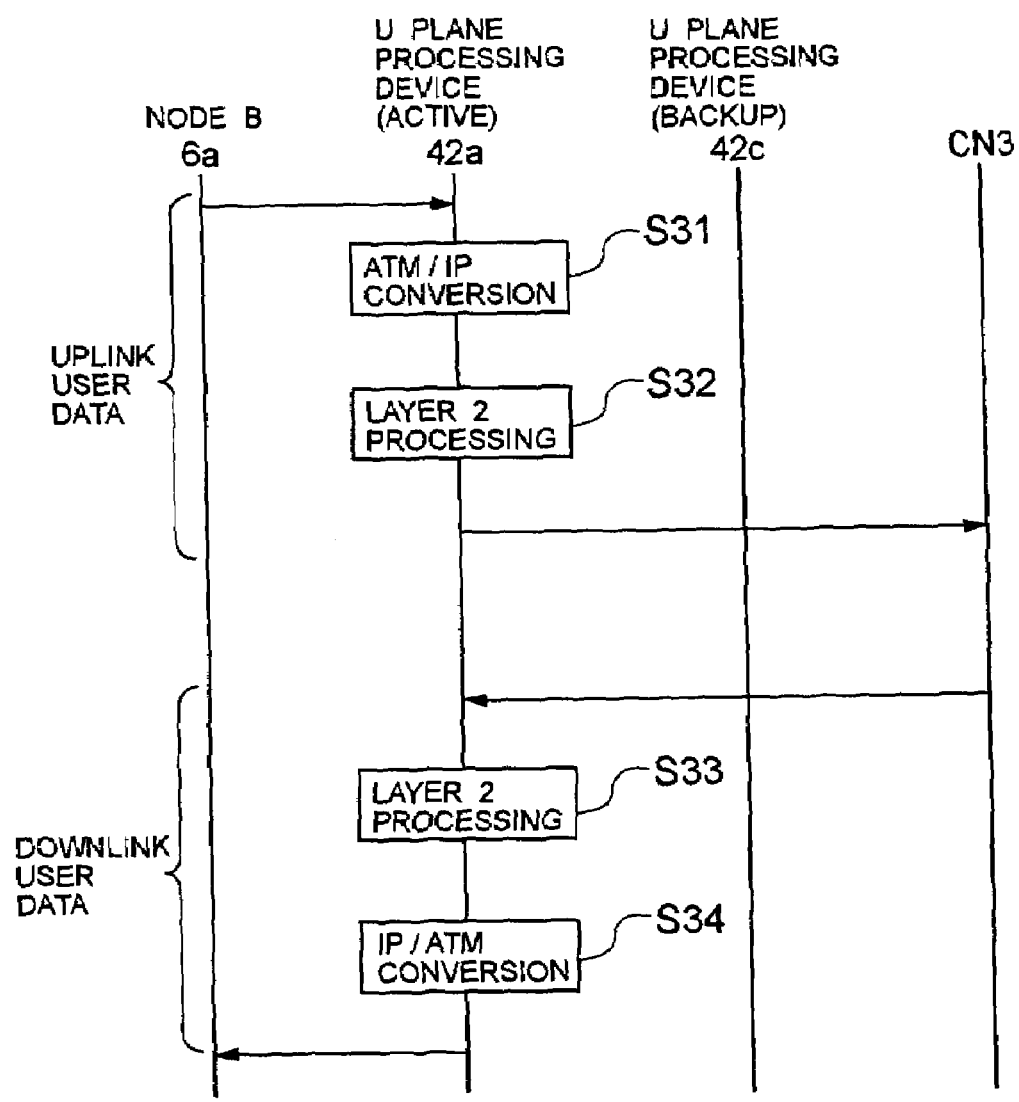
FIG. 13 is an operational sequence diagram in the case shown in FIG. 12.

FIGS. 12 and 13 show a flow of uplink and downlink user data and an operational sequence, respectively, when the active U plane processing device 42a is not in the congestion state but in the normal state. When the U plane processing device 42a is not in the congestion state, the uplink user data received from the Node B6a is converted from the ATM packet to the IP packet in the ATM/IP-IF part 71 (step S31), and is thereafter subjected to the Layer 2 processing in the Layer 2 processing part 72, and then transferred to the CN 3.

The downlink user data from the CN 3 is transmitted to the U plane processing device 42a and then subjected to the Layer 2 processing in the Layer 2 processing part 72 (step S33), followed by conversion from the IP packet to the ATM packet in the ATM/IP-IF part 71 (step S34), then finally transmitted to the Node B6a. At this time, the backup U plane processing device 42c monitors the user data transmitted between the CN 3 and the U plane processing device 42a.

Figure 14:
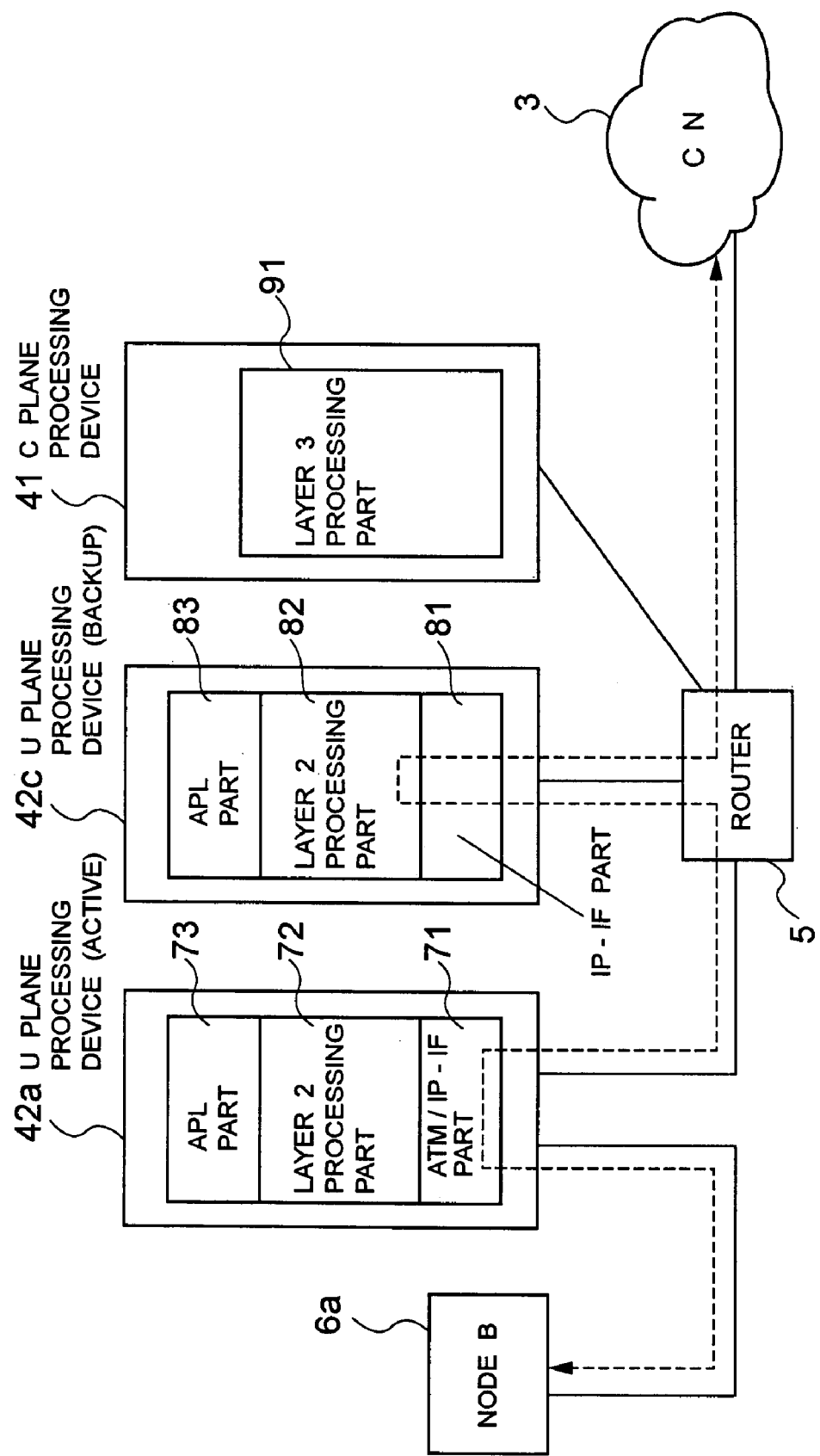
FIG. 14 is a diagram showing a flow of the user data in the congestion state in the embodiment of the present invention.
Figure 15:
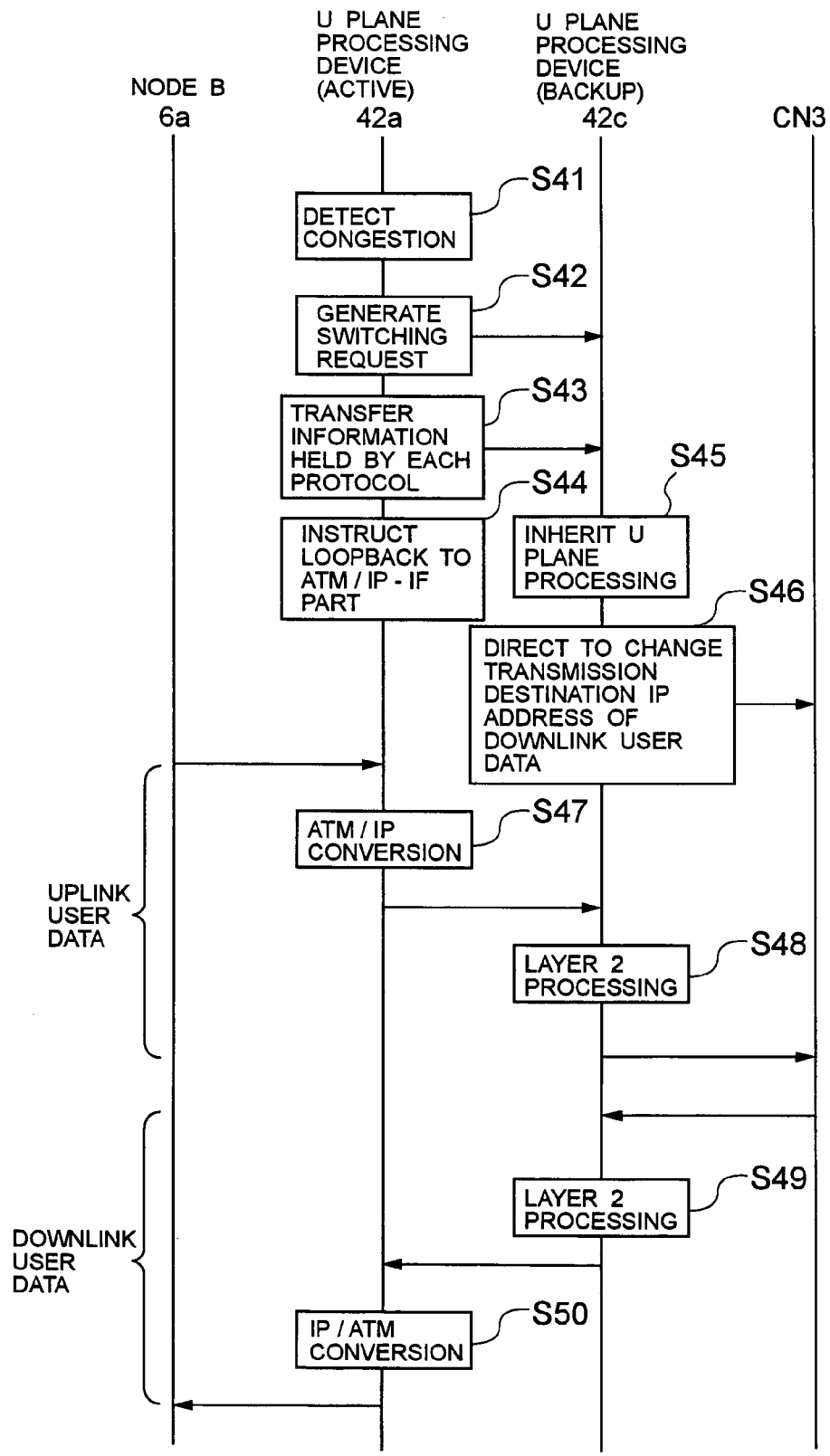
FIG. 15 is an operational sequence diagram in the case shown in FIG. 14.

FIGS. 14 and 15 show a flow of the uplink and downlink user data and an operational sequence, respectively, when the U plane processing device 42a goes into the congestion state. When the U plane processing device 42a goes into the congestion state, similarly to the foregoing example in FIGS. 10 and 11, the congestion is detected (step S41), the switching request is generated to switch the processing to the backup U plane processing device 42c (step S42), and the call information of calls to be inherited, that is held by each protocol, is transferred to the backup U plane processing device 42c (step S43).

At the same time of the above, the user data is made not to reach the upper but is made to loop back in the ATM/IP-IF part 71 (step S44). Subsequently, the backup U plane processing device 42c received the switching request of processing from the U plane processing device 42a develops the transferred call information in each protocol to thereby inherit the call processing to be inherited (step S45).

The backup U plane processing device 42c directs the CN 3 by the downlink signal transmission destination IP address direction part 834 to change the transmission destination IP address of the downlink user data of calls to be inherited from the IP address of the active U plane processing device 42a to the IP address of the device 42c itself (step S46). Therefore, the CN 3 has a function of changing the transmission destination IP address of the downlink user data for every call in accordance with the direction from the backup U plane processing device 42c.

At this time, the uplink user data transferred from the U plane processing device 42a includes the designated IP address of the backup U plane processing device 42c (the IP address is designated in the ATM/IP-IF part 71) (step S47), so that the backup U plane processing part 42c takes in this user data and performs the Layer 2 processing thereto (step S48).

On the other hand, the downlink user data from the CN 3 includes the designated IP address of the backup U plane processing device 42c in place of the IP address of the U plane processing device 42a, so that the backup U plane processing device 42c takes in the user data designating the U plane processing device 42c itself by distinguishing the IP address of the IP header of the downlink user data.

Subsequently, the user data taken in by the U plane processing device 42c is subjected to the Layer 2 processing (step S49), and is then converted from the IP packet to the ATM packet in the ATM/IP-IF part 71 of the U plane processing device 42a (step S50), and finally transmitted to the Node B6a.

In the foregoing embodiment, the ATM/IP-IF is used for an interface with the Node B, however, when an IP interface is eventually used for the interface with the Node B as a result of advanced IP networking of the RAN, the conversion processing between the ATM packet and IP packet is no longer necessary when the active U plane processing device goes into the congestion state and thus switches the processing thereof to the backup U plane processing device, eliminating the necessity of passing through the ATM/IP-IF part 71 of the active U plane processing device 42a. This allows the backup U plane processing device 42c to inherit all the processing in the active U plane processing device 42a, which means that the U plane processing device 42a may not interrupt services even when causing system down or needing to halt the system in updating and adding files, and all the processing may be inherited to the backup U plane processing device 42c.

In the foregoing embodiment, it is described the case where, after the active U plane processing device 42a goes into the congestion state, it is inherited part of a plurality of calls currently being connected (call connection unit) to the backup U plane processing device 42c, however, there is a conceivable case where, when the mobile unit (UE) brings a new call connection request in a state that the active U plane processing device 42a is nearly congested, this new call is inherited to the backup U plane processing device 42c. The operation in this case will be described below referring to FIGS. 16 and 17.

Figure 16:
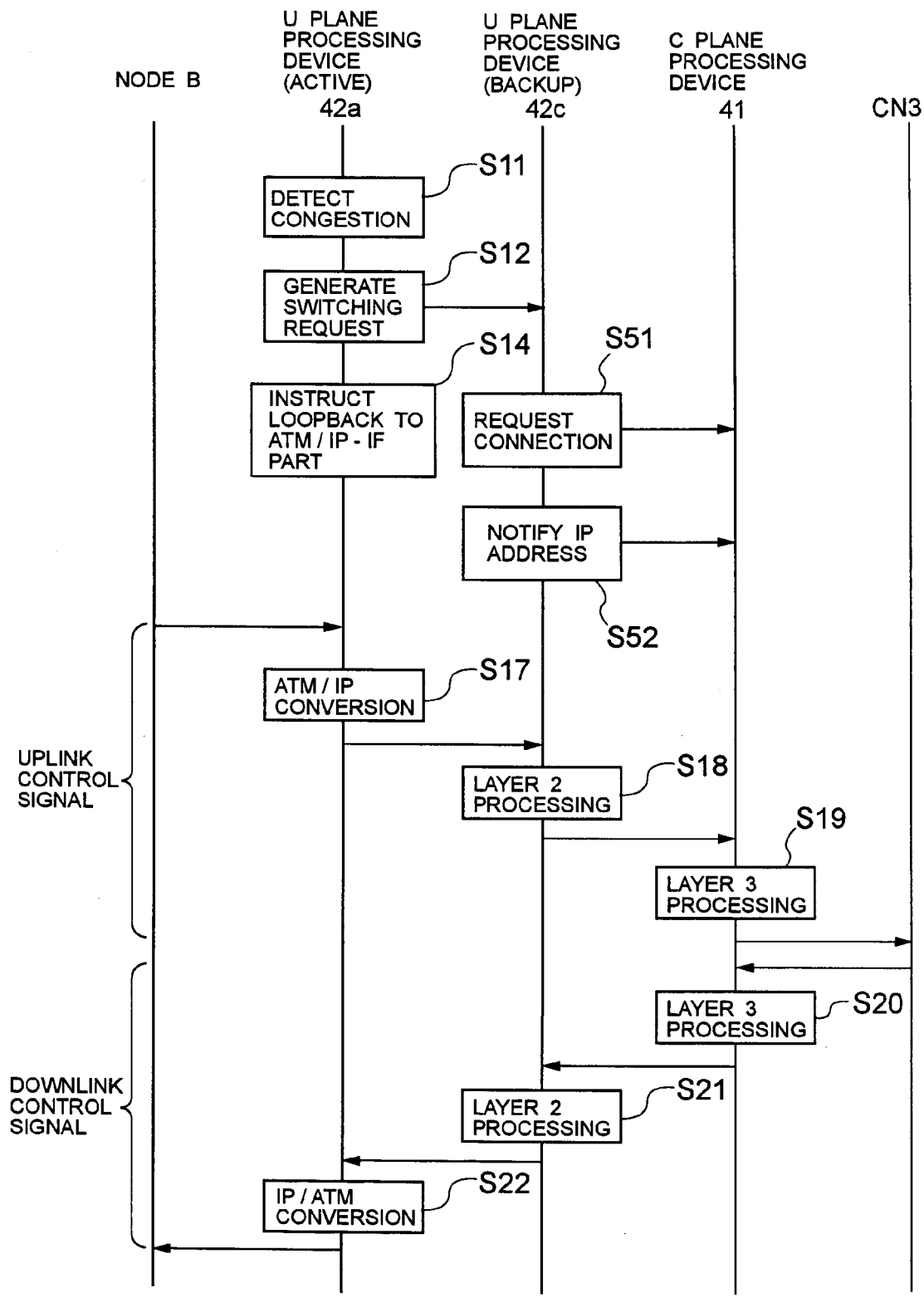
FIG. 16 is an operational sequence diagram for the control signal in the congestion state in another embodiment of the present invention.

First, the control signal is described with reference to FIG. 16. In the state shown in FIG. 8, when the active U plane processing device 42a is close to the congestion state and a connection request comes from a new mobile unit to the U plane processing device 42a, the U plane processing device 42a reaches the congestion state, and therefore generates the switching request so as to inherit the processing for the connection request to the backup U plane processing device 42c when detecting the congestion, and further generates a loopback instruction to the ATM/IP-IF part 71, these processing of which are the same as in steps S11, S12, and S14 of FIG. 11.

The backup U plane processing device 42c having received this request transmits the connection request to the C plane processing device 41 (step S51) as well as notifies the C plane processing device 41 of the IP address of the backup U plane processing device 42c (step S52). Then, the subsequent processing is the same as the operations in steps S17 to S22 of FIG. 11 and the flow of the control signal shown in FIG. 10, wherein the packets of both the uplink and downlink control signals processed in the backup U plane processing device 42c hold the designated IP address of the backup U plane processing device 42c.

Figure 17:
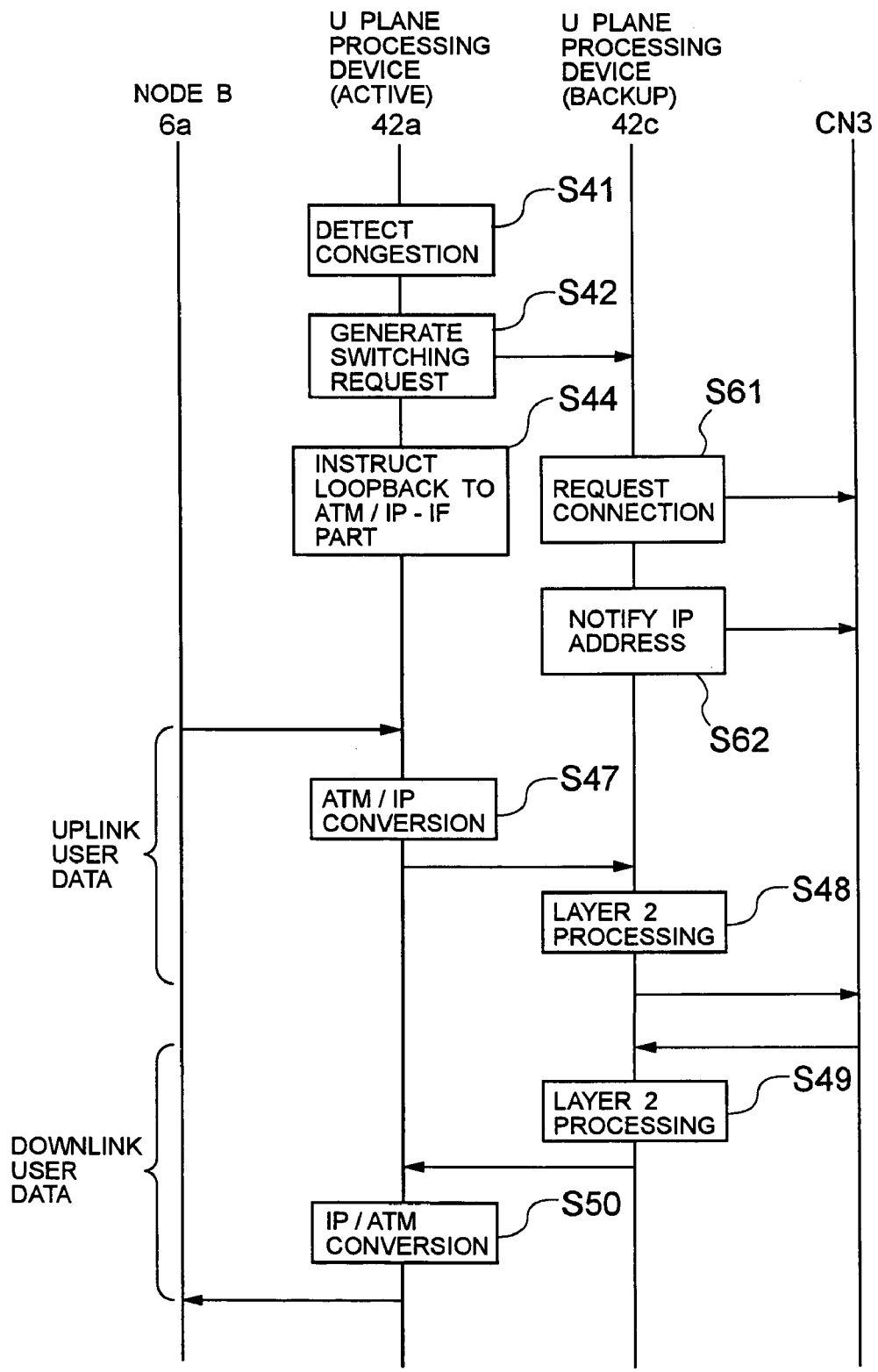
FIG. 17 is an operational sequence diagram for the user data in the congestion state in the embodiment of still another present invention.

Next, user data is described with reference to FIG. 17. In the state shown in FIG. 12, when the active U plane processing device 42a is close to the congestion state and a connection request comes from a new mobile unit to the U plane processing device 42a, the U plane processing device 42a reaches the congestion state, and generates the switching request so as to inherit the processing for the connection request to the backup U plane processing device 42c when detecting the congestion, and further generates the loopback instruction to the ATM/IP-IF part 71, these processing of which are the same as in steps S41, S42, and S44 of FIG. 15.

The backup U plane processing device 42c having received this request transmits the connection request to the CN 3 (step S61) as well as notifies the CN 3 of the IP address of the backup U plane processing device 42c (step S62). The subsequent processing is the same as the operations in steps S47 to S50 of FIG. 15 and the flow of the user data shown in FIG. 12, wherein and the packets of both the uplink and downlink user data hold the designated IP address of the backup U plane processing device 42c.

As described above, in a W-CDMA mobile communication system according to the present invention, even when data communication using notebook-sized personal computers or the use of large amount of data such as images or moving pictures is accelerated and the upsurge of the user data amount is thereby expected, the processing loads in the RAN handling the user data may easily be distributed, and system down of the entire system may effectively be prevented. This is because, when the U plane processing device handling the user data goes into the congestion state, the U plane processing device is able to inherit part of the processing to another backup U plane processing device to thereby continuously perform the processing.

What is claimed is:

1. A mobile communication system which includes a mobile unit, a radio base station, and a radio controller, wherein
the radio controller comprises:
first and second user plane processing means for performing processing to control transfer of user data in relation to the mobile unit; and
control plane processing means for processing to control transfer of signaling having a control signal, the control plane processing means being physically separated from the first and second user plane processing means, and
when detecting a congestion state of processing, the first user plane processing means transfers a first part of the processing to the second user plane processing means while maintaining a second part of the processing at the first user plane processing means,
wherein said first user plane processing means comprises:
a Layer 2 processing unit;
an ATM/IP interface unit that is configured to convert ATM packets input thereto from an external node to IP packets and to transfer the IP packets to either said Layer 2 processing unit or to a router, said ATM/IP interface unit also configured to convert IP packets input thereto from said Layer 2 processing unit or from said router into ATM packets and to transfer said ATM packets to said external node; and
an APL unit that is configured to provide control information to said ATM/IP interface unit to direct transfer of said ATM packets and said IP packets to either said Layer 2 processing unit or said router,
wherein said APL unit comprises:
a lower protocol management part;
a congestion detection part that detects a state of congestion;
a congestion state control part that performs control during the state of congestion as detected by said congestion detection part;
a control unit for controlling said lower protocol management part, said congestion detection part, and said congestion state control part; and
a bus that communicatively connects said lower protocol management part, said congestion detection part, and said congestion state control part.

2. The mobile communication system according to claim 1, wherein
the first user plane processing means is an active system connected to the radio base station, and
the second user plane processing means is a backup system for the first user plane processing means.

3. The mobile communication system according to claim 1, wherein the first user plane processing means comprises means for, in response to the detection of the congestion state, controlling so as to switch a transmission/reception destination of the control signal and the user data to the second user plane processing means as well as transmitting a switching direction to the second user plane processing means, and means for notifying the second user plane processing means of information necessary for processing transferred to the second user plane processing means.

4. The mobile communication system according to claim 3, wherein the second user plane processing means comprises means for inheriting the information in response to the notice of the information as well as processing the control signal and the user data in response to reception of the switching direction.

5. The mobile communication system according to claim 1, wherein
the radio base station is present in a first communication network, and the first and second user plane processing means and the control plane processing means are connected to a second communication network different from the first communication network, and
the first user plane processing means further comprises conversion interface means between the first and second communication networks.

6. The mobile communication system according to claim 5, wherein the second user plane processing means transmits and receives the control signal and the user data via the conversion interface means in the first user plane processing means.

7. The mobile communication system according to claim 5, wherein the first communication network includes an ATM communication network, and the second communication network includes an IP communication network.

8. The mobile communication system according to claim 1, wherein the congestion state of processing corresponds to the first user plane processing means operating in a normal state of operation, but with an input amount of data to be processed by the first user plane processing means being greater than a predetermined amount.

9. The mobile communication system according to claim 1, wherein the first user plane processing means controls the transfer of the second part of the processing to the second user plane processing means.

10. A mobile communication system which includes a mobile unit, a radio base station, and a radio controller, wherein
the radio controller comprises:
first and second user plane processing devices configured to perform processing to control transfer of user data in relation to the mobile unit; and
a control plane processing device configured to control transfer of signaling having a control signal, the control plane processing device being physically separated from the first and second user plane processing devices, and
when detecting a congestion state of processing, the first user plane processing device transfers a first part of the processing to the second user plane processing device while maintaining a second part of the processing at the first user plane processing device,
wherein said first user plane processing device comprises:
a Layer 2 processing unit;
an ATM/IP interface unit that is configured to convert ATM packets input thereto from an external node to IP packets and to transfer the IP packets to either said Layer 2 processing unit or to a router, said ATM/IP interface unit also configured to convert IP packets input thereto from said Layer 2 processing unit or from said router into ATM packets and to transfer said ATM packets to said external node; and
an APL unit that is configured to provide control information to said ATM/IP interface unit to direct transfer of said ATM packets and said IP packets to either said Layer 2 processing unit or said router,
wherein said APL unit comprises:
a lower protocol management part;
a congestion detection part that detects a state of congestion;
a congestion state control part that performs control during the state of congestion as detected by said congestion detection part;
a control unit for controlling said lower protocol management part, said congestion detection part, and said congestion state control part; and
a bus that communicatively connects said lower protocol management part, said congestion detection part, and said congestion state control part.

11. The mobile communication system according to claim 10, wherein
the first user plane processing device is an active system connected to the radio base station, and
the second user plane processing device is a backup system for the first user plane processing device.

12. The mobile communication system according to claim 10, wherein the first user plane processing device comprises a control unit configured to, in response to the detection of the congestion state, controlling so as to switch a transmission/reception destination of the control signal and the user data to the second user plane processing device as well as transmitting a switching direction to the second user plane processing device, and means for notifying the second user plane processing device of information necessary for processing transferred to the second user plane processing device.

13. The mobile communication system according to claim 12, wherein the second user plane processing device comprises an inheriting unit configured to inherit the information in response to the notice of the information as well as processing the control signal and the user data in response to reception of the switching direction.

14. The mobile communication system according to claim 10, wherein
the radio base station is present in a first communication network, and the first and second user plane processing device and the control plane processing device are connected to a second communication network different from the first communication network, and
the first user plane processing device further comprises a conversion interface unit configured to provide interface conversion of information sent between the first and second communication networks.

15. The mobile communication system according to claim 14, wherein the second user plane processing device transmits and receives the control signal and the user data via the conversion interface unit in the first user plane processing device.

16. The mobile communication system according to claim 14, wherein the first communication network includes an ATM communication network, and the second communication network includes an IP communication network.

* * * * *